(12) United States Patent
Onozawa

(10) Patent No.: US 7,403,705 B2
(45) Date of Patent: Jul. 22, 2008

(54) CAMERA DEVICE HAVING AUTOMATIC FOCUSING FUNCTION

(75) Inventor: Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 302 days.

(21) Appl. No.: 11/194,436

(22) Filed: Aug. 1, 2005

(65) Prior Publication Data

US 2006/0029381 A1    Feb. 9, 2006

(30) Foreign Application Priority Data

Aug. 4, 2004    (JP)    ............................ 2004-227428

(51) Int. Cl.
*G03B 13/30* (2006.01)
*G03B 7/00* (2006.01)
*G03B 17/00* (2006.01)
*G03B 17/18* (2006.01)
*G03B 3/00* (2006.01)
*G02B 7/04* (2006.01)
*G02B 27/40* (2006.01)
*G02B 27/64* (2006.01)

(52) U.S. Cl. ........................ 396/147; 396/70; 396/88; 396/287; 396/290; 250/201.4; 250/201.7

(58) Field of Classification Search ................ 396/70, 396/88, 147, 163, 281, 287, 290–292, 374; 348/346; 250/201.7
See application file for complete search history.

(56) References Cited

U.S. PATENT DOCUMENTS

| | | | |
|---|---|---|---|
| 5,258,802 A | | 11/1993 | Arimoto et al. |
| 5,365,297 A | | 11/1994 | Arimoto et al. |
| 5,465,130 A | * | 11/1995 | Eguchi ........................ 396/103 |
| 5,915,133 A | * | 6/1999 | Hirai et al. ..................... 396/48 |
| 6,081,670 A | * | 6/2000 | Madsen et al. ................ 396/88 |
| 6,222,538 B1 | * | 4/2001 | Anderson .................... 715/709 |
| 6,453,124 B2 | * | 9/2002 | Morimoto et al. ............. 396/91 |
| 6,724,429 B2 | * | 4/2004 | Shore et al. .................. 348/373 |
| 6,760,548 B2 | * | 7/2004 | Seki et al. .................... 396/287 |

FOREIGN PATENT DOCUMENTS

| | | |
|---|---|---|
| CN | 1044993 A | 8/1990 |
| EP | 0 946 044 A2 | 9/1999 |
| JP | 5-241228 A | 9/1993 |
| JP | 10-221593 A | 8/1998 |
| JP | 11-119077 A | 4/1999 |
| JP | 11-218829 A | 8/1999 |
| JP | 2000-047315 A | 2/2000 |
| JP | 2002-023040 A | 1/2002 |
| JP | 2003-319246 A | 11/2003 |
| JP | 2005-202064 A | 7/2005 |

* cited by examiner

*Primary Examiner*—W. B. Perkey
*Assistant Examiner*—Andrew Williams
(74) *Attorney, Agent, or Firm*—Frishauf, Holtz, Goodman & Chick, P.C.

(57) ABSTRACT

A camera device is provided which has an optical system including a focus lens, focus control for focusing the optical system on a subject by driving the focus lens, and display control for causing a display to display numerals indicating a first distance of a close end and a second distance of a remote end of a subject distance range in which the focus control can focus the optical system.

13 Claims, 9 Drawing Sheets

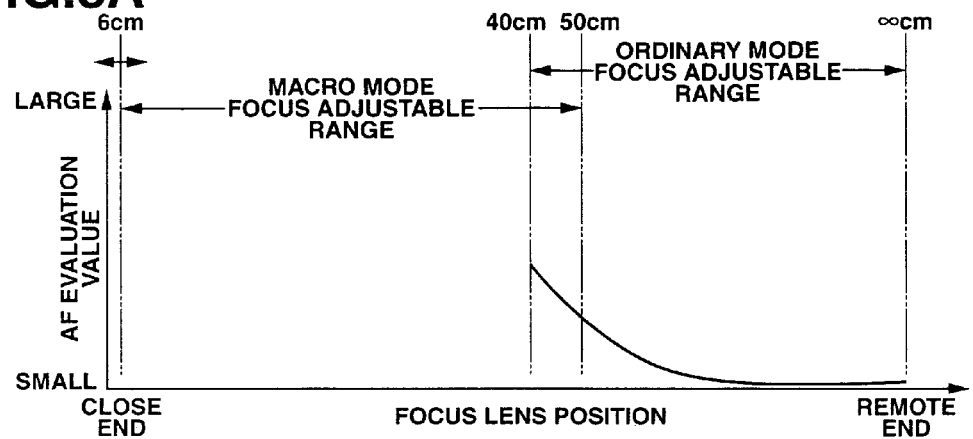
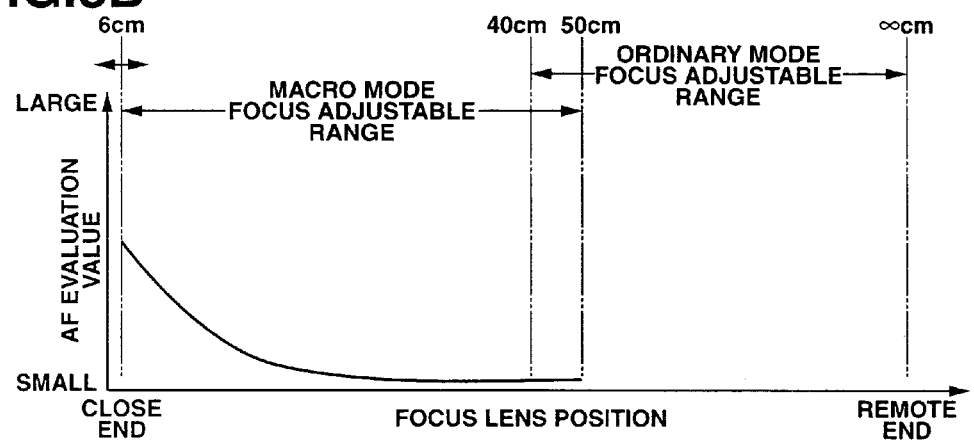
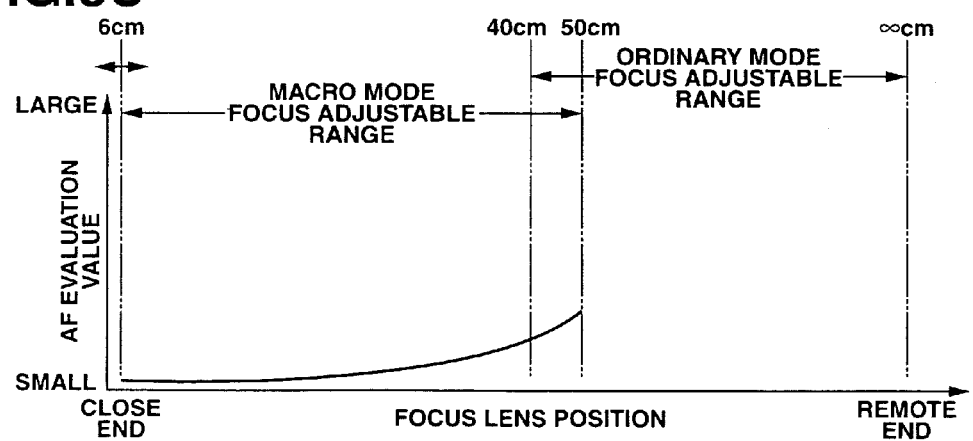

CAMERA DEVICE HAVING AUTOMATIC FOCUSING FUNCTION

CROSS-REFERENCE TO RELATED APPLICATIONS

This application is based upon and claims the benefit of priority from prior Japanese Patent Application No. 2004-227428, filed Aug. 4, 2004, the entire contents of which are incorporated herein by reference.

BACKGROUND OF THE INVENTION

1. Field of the Invention

The present invention relates to a camera device having an automatic focusing function usable in a digital camera.

2. Description of the Related Art

Hitherto, in a camera device such as a digital camera or a conventional camera using a silver salt film, an automatic focusing function by various systems has been used generally. Some of the automatic focusing functions of a digital camera are designed to set in plural focusing modes different in range of a subject distance focusing on the subject (focus adjustable range). General focus modes include an ordinary mode for covering a photographing distance from tens of centimeters to an infinite distance for use in scenery or snap photographing, and a macro mode for covering a photographing distance from several centimeters to tens of centimeters for use in close-up photographing of small subjects such as flowers and insects.

In a camera device having plural focus modes, it is intended to inform a photographer of a currently set focus mode by a display device at the time of photographing.

BRIEF SUMMARY OF THE INVENTION

According to an embodiment of the present invention, a camera device comprises:
an optical system including a focus lens;
focus control means for focusing the optical system on a subject by driving the focus lens;
display means; and
display control means for causing the display means to display numerals indicating a first distance of a close end and a second distance of a remote end of a subject distance range in which the focus control means can focus the optical system.

According to another embodiment of the present invention, a camera device comprises:
an optical system including a focus lens;
focus control means for focusing the optical system on a subject by driving the focus lens;
display means;
information display mode selecting means to select a type of an information display mode, and
display control means for causing the display means to display a subject distance at which the focus control means can focus the optical system in one of different display modes which corresponds to the type of the information display mode selected by the information display mode selecting means.

According to another embodiment of the present invention, a camera device comprises:
an optical system including a focus lens;
focus control means for focusing the optical system on a subject by driving the focus lens;
display means;
detecting means for detecting change of a subject distance at which the focus control means can focus the optical system; and
display control means for causing the display means to, when change of the distance is detected by the detecting means, display the changed distance for a predetermined time.

According to another embodiment of the present invention, a camera device comprises:
an optical system including a focus lens;
focus control means for focusing the optical system on a subject by driving the focus lens;
display means;
detecting means for detecting a focus disable state due to a fact that a subject distance is closer than a close end of a subject distance range in which the focus control means can focus the optical system, during focusing operation of the focus control means; and
display control means for causing the display means to, when the focus disable state is detected by the detecting means, display an allowable subject distance at which the focus control means can focus the optical system.

According to another embodiment of the present invention, a camera device comprises:
an optical system including a focus lens;
contrast detecting means for detecting a contrast value of a subject image taken by an image capture means;
focus control means for focusing the optical system on a subject by driving the focus lens based on plural contrast values detected by the contrast detecting means while driving the focus lens;
display means;
focus mode setting means for setting one of focus modes different in the subject distance range in which the focus control means can focus the optical system;
focus mode control means for changing setting of the focus mode by the focus mode setting means based on changing tendency of plural contrast values detected by the contrast detecting means during moving operation of the focus lens by the focus control means based on the focus mode set by the focus setting means; and
display control means for causing the display means to display a subject distance at which the focus control means can focus the optical system in the focus mode after the change in accordance with the change of the focus mode by the focus mode control means.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIGS. 8A, 8B, and 8C are views showing examples of variation tendency of AF evaluation-values when a focal position is not established in AF process.

DETAILED DESCRIPTION OF THE INVENTION

An embodiment of a camera device according to the present invention will now be described with reference to the accompanying drawings.

Figure 1:
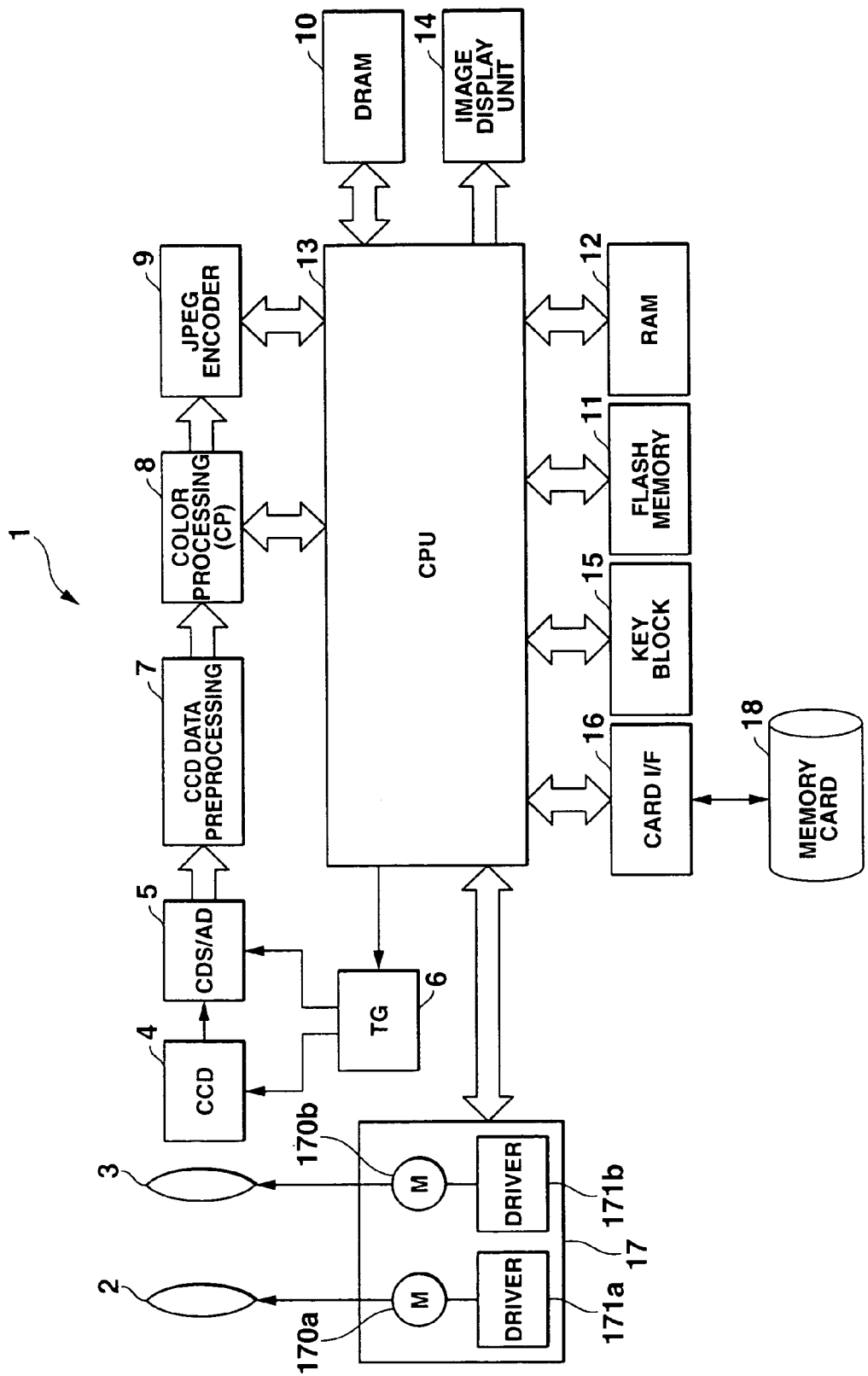
FIG. 1 is a block diagram of a digital camera according to an embodiment of the invention.

FIG. 1 is a block diagram of a digital camera 1 according to an embodiment of the invention. The digital camera 1 has an auto-focus (AF) function, and comprises a focus lens 2, a zoom lens 3 (zoom means), a charge coupled device (CCD) 4, a correlation double sampling (CDS)/analog-to-digital conversion (AD) block 5, a timing generator (TG) 6, a CCD data preprocessing block 7, a color processing (CP) block 8, a joint photographic expert group (JPEG) encoder 9, a dynamic random access memory (DRAM) 10, a built-in flash memory 11, a RAM 12, a central processing unit (CPU) 13, an image display unit 14, a key block 15, a card interface 16, and a motor drive block 17. A memory card 18 detachably loaded in a card slot of a camera main body (not shown) is connected to the card interface 16.

The focus lens 2 and zoom lens 3 are individually composed of a lens group (not shown). The motor drive block 17 is composed of a focusing motor 170a for driving the focusing lens 2 in the optical axis direction, a zoom motor 170b for driving the zoom lens 3 in the optical axis direction, and motor drivers 171a, 171b for driving the focus motor 170a and the zoom motor 170b, respectively, according to control signals sent from the CPU 13.

The CCD 4 is image pickup means, which photoelectrically converts a subject image formed by way of the focus lens 2 and zoom lens 3, and outputs the converted image as an image pickup signal. The TG 6 generates a timing signal at predetermined frequency, and drives the CCD 4. The CDS/AD block 5 samples the output signal from the CCD 4 to eliminate noise, and converts the signal into a digital signal. The CCD data preprocessing block 7 carries out data processing such as a luminance signal processing to the digitally converted image pickup signal. The color processing (CP) block 8 carries out color processing such as color separation to the image signal after luminance signal processing, and generates image data of Y, Cb, and Cr. The DRAM 10 sequentially stores the image data of Y, Cb, Cr after color processing.

The image display unit 14 includes a color LCD and a driving circuit for driving the color LCD. In a photographing waiting state before a shutter release key is pressed while a photographing mode has been set, the display unit 14 displays through-images based on image data of the portion of one frame (screen) taken in from the CCD 4 and stored in the DRAM 10, and in a state in which a reproduction mode is set, the display unit 14 displays recorded images based on image data read out from the memory card 18 and expanded. The image display unit 14 also displays various items of information as required, and functions as display means of the invention.

The JPEG encoder 9 JPEG-compresses the image data input from the color processing (CP) block 8 at the time of image recording. The memory card 18 records the compressed image data sent through the card interface 16. The recorded image data is read out when reproducing the recorded image, expanded by the JPEG encoder 9, and displayed in the image display unit 14. The key block 15 includes various operation keys, such as a change key for changing over a photographing mode and a reproducing mode, a shutter release key, and a zoom key for varying a zoom factor, and the key block sends an operation signal corresponding to key operation to the CPU 13. The change key functions as information display mode selecting means of the invention, and the zoom key functions as the change operation means of the invention. The shutter release key has a so-called half-shutter function, and is configured to be pushed half as notice of photographing and to be pushed to the full for instruction of photographing.

The flash memory 11 stores programs and various data necessary for control of the digital camera 1 by the CPU 13, that is, AF control, AE control, AWB control, etc. The CPU 13 operates the RAM 12 as a working memory according to the operation signal from the key block 15 and program, and thereby functions as focus mode control means, focus mode setting means, detecting means, acquiring means, and display control means of the invention.

The AF control is a contrast detection system for detecting an AF evaluation value (contrast value) from an image taken at each position while moving the focus lens 2 in the optical axis direction, and determining a peak position of the AF evaluation value as a focal position, and two modes can be set as AF modes, ordinary and macro. This is intended to assure the speed and precision of AF operation due to realization of a specific peak search in a short time by limiting the search range of the focal position (peak position of AF evaluation value) in AF operation.

Figure 2:
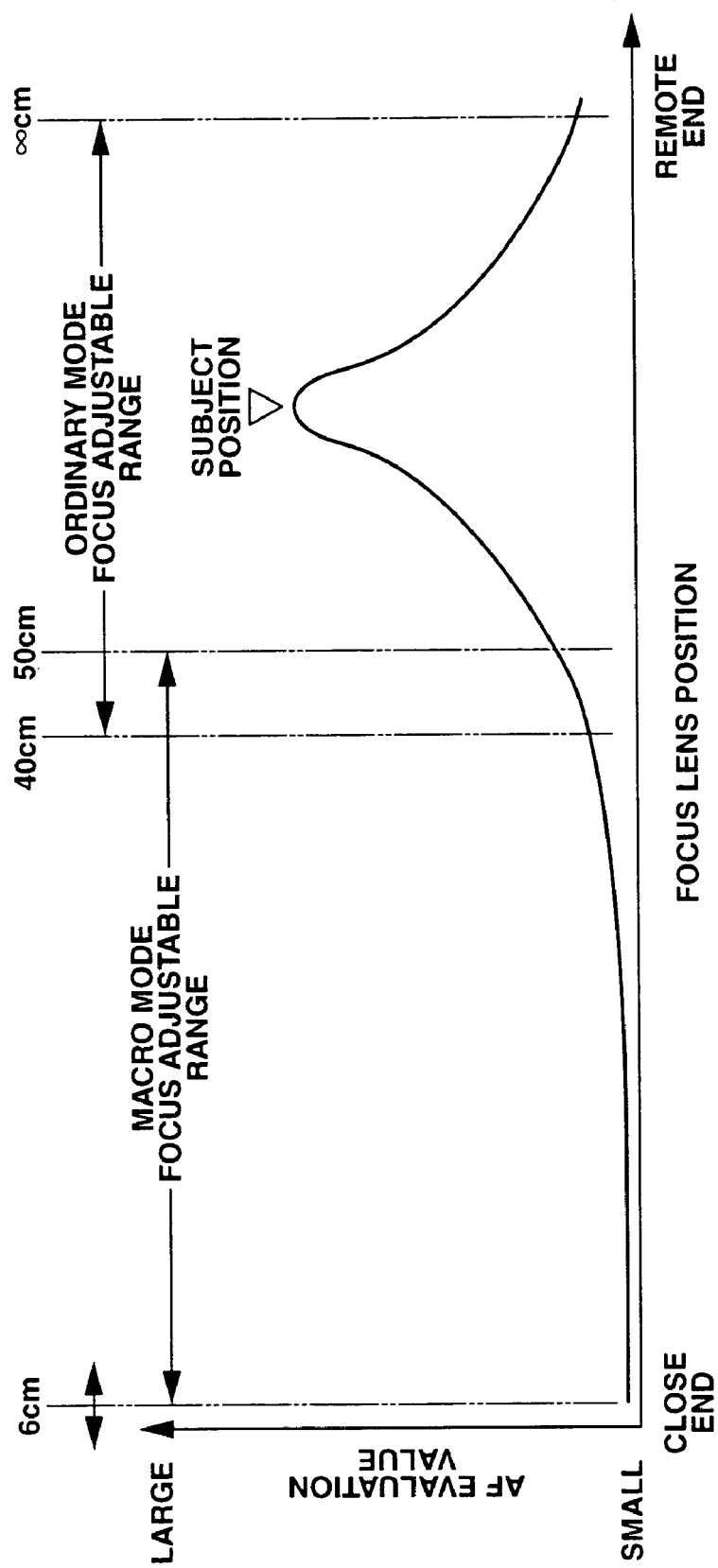
FIG. 2 is a diagram showing a difference in search range of a focal position depending on types of AF modes.

In the embodiment, the moving range of the focus lens 2 corresponding to the search range is represented by a relative position on the basis of the subject distance and varies depending on the zoom position, so as not to change the search range even if the position of the zoom lens 3 (zoom position) is changed due to change of an angle of view (zoom factor), and the search range is the subject distance range actually adjusted in focus (focus adjustable range). As shown in FIG. 2, the search range in the macro mode is from the shortest photographing distance (close end) determined by the optical characteristic of the focus lens 2 and zoom lens 3 to 50 cm, and the search range in the ordinary mode is 40 cm to ∞. The shortest photographing distance varies with the relation with the zoom position, and it is, for example, 6 cm.

In the digital camera 1 of the embodiment, the normal mode and professional mode can be set as information display modes for displaying information on a screen in a recording mode.

Figure 3:
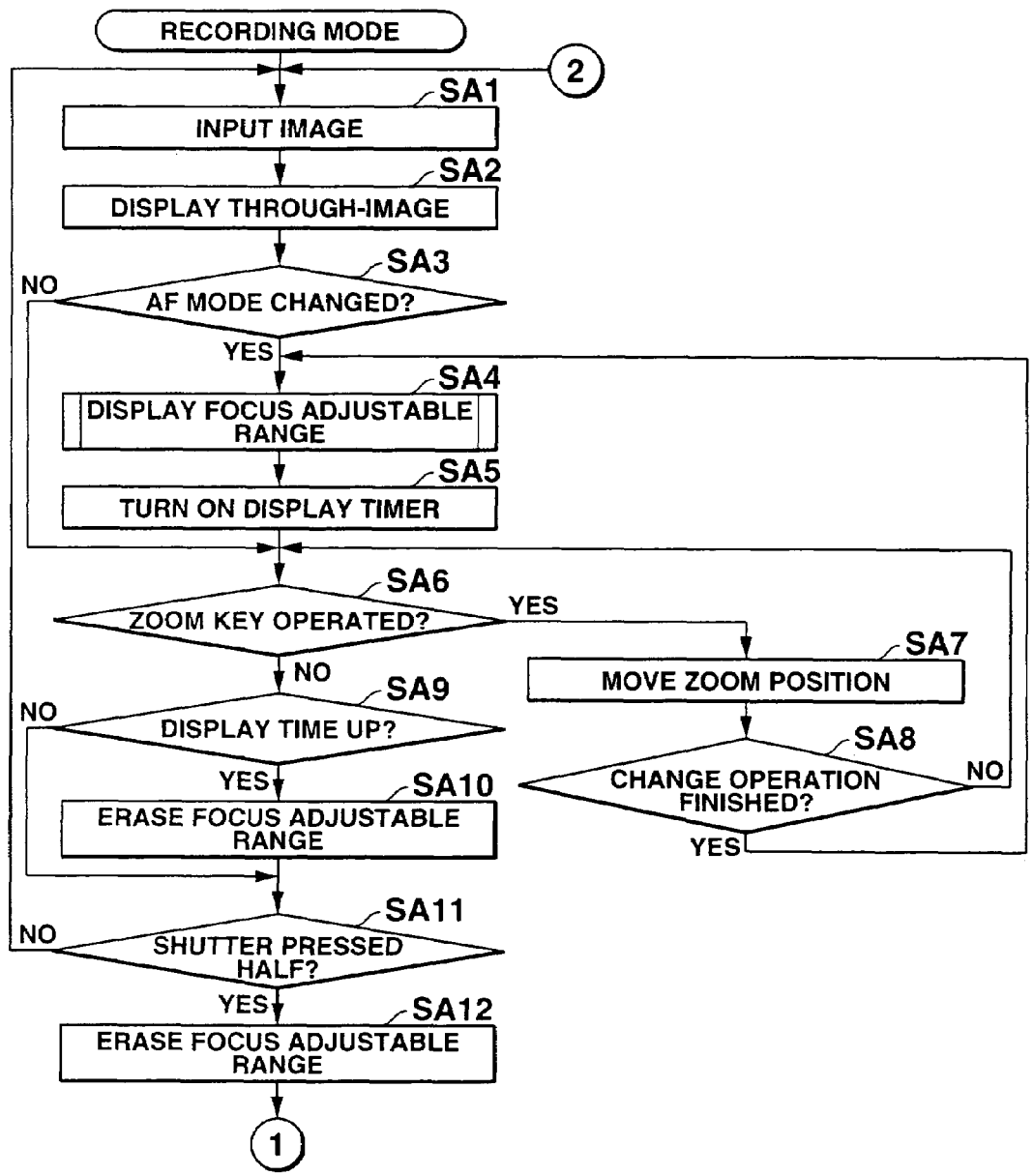
FIG. 3 is a flowchart showing the processing operation executed by a CPU in a recording mode.
Figure 4:
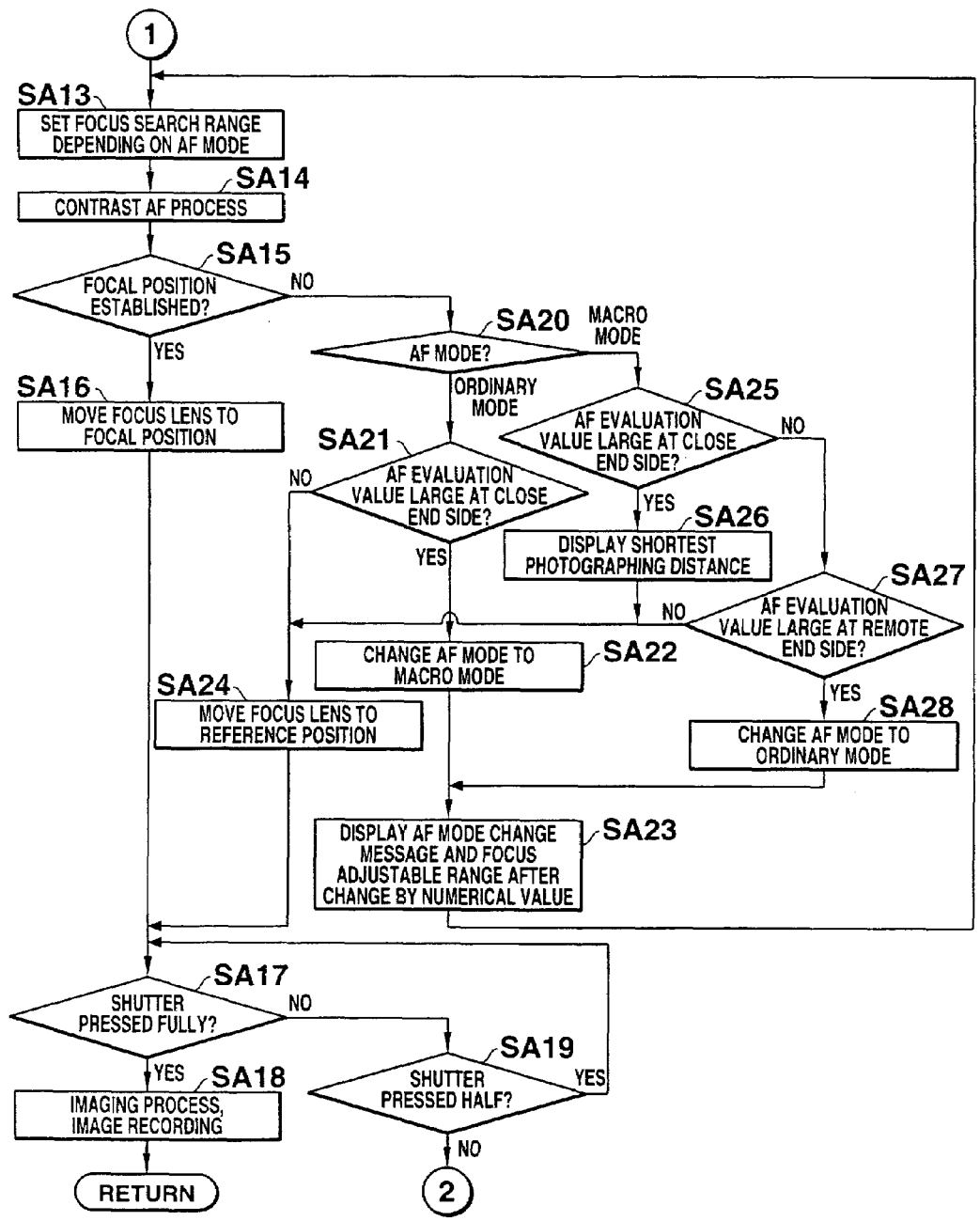
FIG. 4 is a flowchart successive to FIG. 3.
Figure 5:
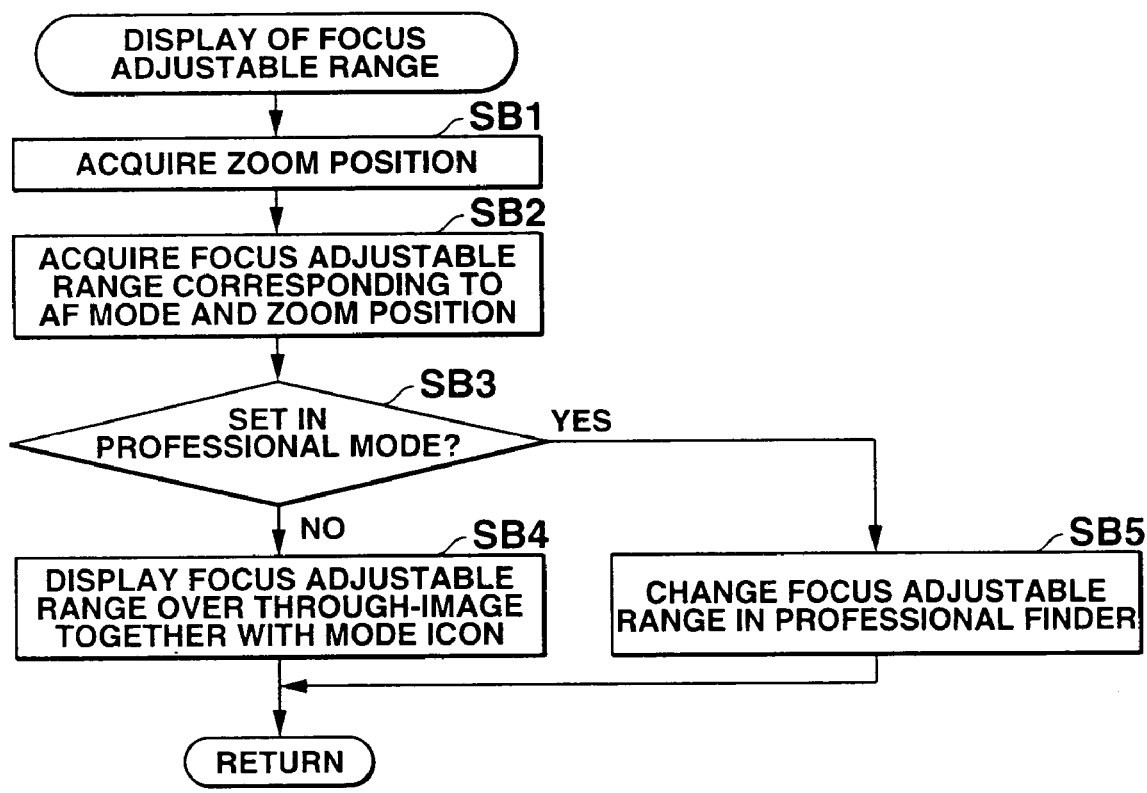
FIG. 5 is a flowchart showing processing of displaying a focus adjustable range.

The operation of the invention in the digital camera 1 having the above configuration will be described below. FIGS. 3 to 5 are flowcharts showing the processing operation executed by the CPU 13 in the recording mode. As shown in FIG. 3, when the recording mode is selected, the CPU 13 starts image pickup process (inputting an image from the CCD 4) at a predetermined frame rate (for example, 30 frames/sec) (step SA1), and displays the input image as a through-image in the color LCD of the image display unit 14

(step SA2). Next, it is determined whether or not the AF mode is changed by the photographer, and if changed (Yes at step SA3), the focus adjustable range is displayed (step SA4).

Detail of the process of display the focus adjustable range (step SA4) is shown in FIG. 5. The zoom position of this point (position of the zoom lens 3) is acquired (step SB1), and the focus adjustable rang corresponding to the type of the AF mode set at this time (after changeover) and the acquired zoom position is acquired (step SB2). In the AF control of the embodiment, as mentioned above, the moving range of the focus lens 2 is controlled relatively on the basis of the subject distance. Therefore, in the case of the ordinary mode, a fixed focus adjustable range is always acquired regardless of the position of the zoom lens 3. In addition, in the case of the macro mode, the focus adjustable range is obtained so that only the shortest photographing distance (close end side) of the focus adjustable range is variable with the position of the zoom lens 3. If, different from the above description, the moving range of the focus lens 2 is directly controlled, both the close end and the remote end are changed depending on the position change of the zoom lens 3 in the macro mode, and only the close end side varies with the position change of the zoom lens 3 in the ordinary mode.

Figure 6A:
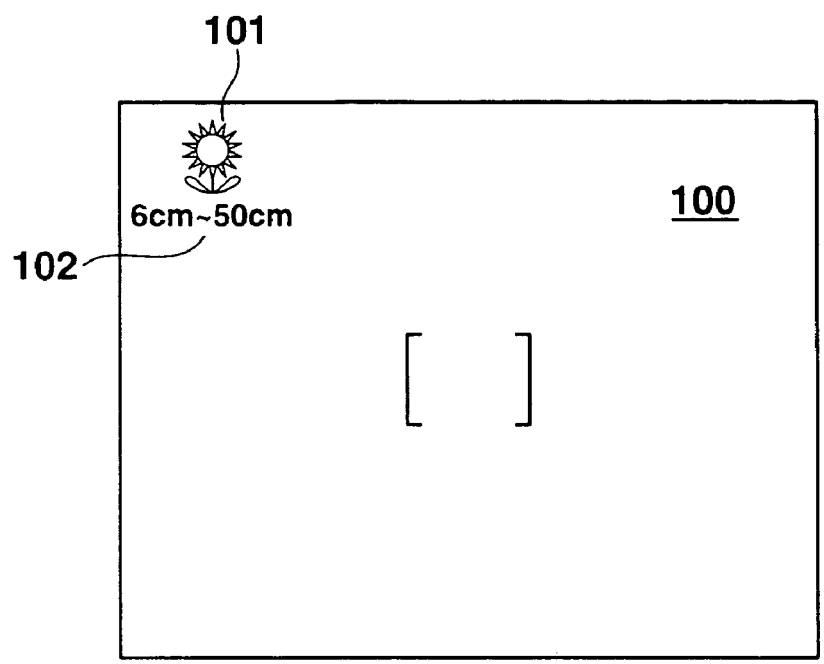
FIGS. 6A and 6B are views showing a display state of a focusing range when a normal mode is set as an information display mode.
Figure 6B:
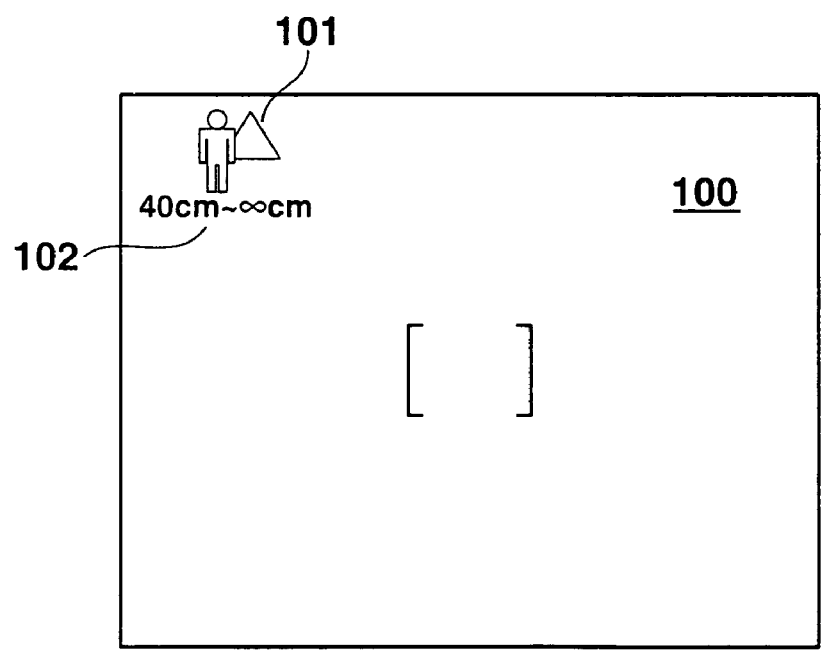

After acquiring the focus adjustable range, it is determined in step SB3 whether or not the professional mode is set as the information display mode. If the normal mode is set (No in step SB3), the focus adjustable range obtained in step SB2 is displayed by overlaying on the predetermined range of the through-image (step SB4). FIGS. 6A and 6B are views showing a display state of the focus adjustable range at this time, FIG. 6A showing a case where the macro mode is set as the AF mode, and FIG. 6B showing a case where the ordinary mode is set as the AF mode. In this embodiment, the distance of the close end and the remote end of the focus adjustable range is displayed by a numerical value 102 immediately beneath a mode icon 101 which is mode information showing the focus mode displayed in the upper left corner of a through-image screen 100. By this display, the photographer can specifically know the focus adjustable range.

Figure 7A:
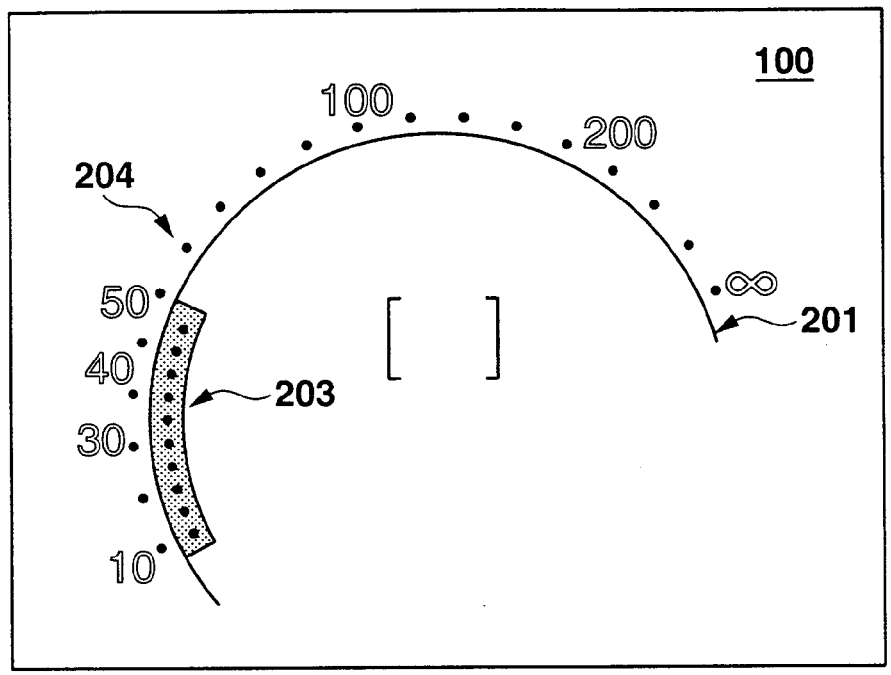
FIGS. 7A and 7B are views showing a display state of a focusing range when a professional mode is set as an information display mode.
Figure 7B:
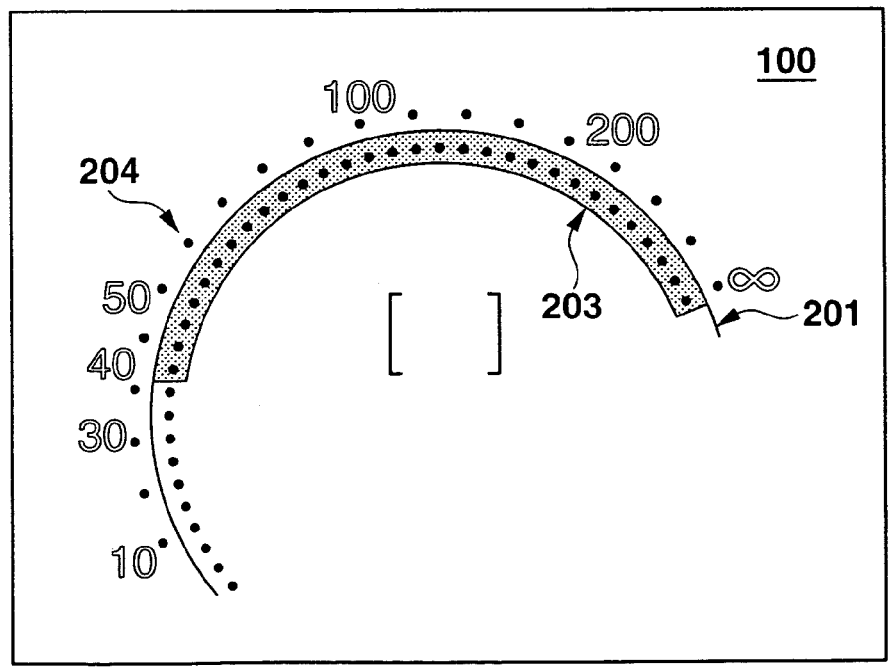

When the professional mode is set as the information display mode (Yes in step SB3), in a display image (professional finder) 204 displayed over the through-image screen 100 as shown in FIGS. 7A and 7B, the length and position of an arc distance icon 203 disposed inside of an arc distance scale 201 having distance graduations provided on the outer circumference thereof are changed depending on the focus adjustable range obtained in step SB2 (step SB5).

FIG. 7A shows an example in which the macro mode is set as the AF mode, and FIG. 7B shows an example in which the ordinary mode is set as the AF mode. By this display image 204, the photographer can specifically and intuitively know the focus adjustable range. In the shown examples, the photographer knows that the focus adjustable range in the macro mode is from the shortest photographing distance (close end), i.e., 6 cm to 50 cm, and that in the ordinary mode is 40 cm to ∞.

After finishing the process of displaying the focus adjustable range in the normal mode or professional mode, back to main flow in FIG. 3, an internal display timer of the CPU 13 immediately starts counting of the display elapsed time of the focus adjustable range (step SA5). Thereafter, if the zoom key or shutter release key is not pressed (No in steps SA6 and SA11), the process returns to step SA1, and the through-image is updated at a specific interval while displaying the focus adjustable range. During this period, when the display elapsed time of the focus adjustable range has reached a predetermined time (for example, 2 seconds) (Yes in step SA9), the numerical value 102 (FIGS. 6A and 6B) or the display image 204 (FIGS. 7A and 7B) showing the focus adjustable range is erased from the screen at this moment (step SA10).

On the other hand, when the zoom key is operated while displaying the numerical value 102 or the display image 204 or after the display is erased (Yes in step SA6), the zoom position is moved to a wide (close) or tele (remote) side depending on the operation (step SA7), and while the zoom key operation continues (No in step SA8), the zoom position is moved continuously. In this period, when the zoom position reaches the wide end or tele end, moving of the zoom position stops on the spot. When the zoom key operation is over (Yes in step SA8), the focus adjustable range is displayed as shown in FIGS. 6A and 6B or 7A and 7B (step SA4).

Accordingly, when the present focus adjustable range is changed by move of the zoom position (in this embodiment, only when the AF mode is set in the macro mode as mentioned above), the change of the focus adjustable range is reflected in the display if the numerical value 102 or display image 204 is displayed at this moment. If the numerical value 102 or display image 204 is not displayed, on the other hand, the numerical value 102 or display image 204 showing the changed focus adjustable range is displayed.

Until the shutter release key is pressed to half (No in step SA11), this process is executed repeatedly. Therefore, the photographer can know the new focus adjustable range changed by changing over the AF mode or moving the zoom position, specifically by the numerical value (see FIGS. 6A and 6B) when the display mode is set in the normal mode, or when the display mode is set in the professional mode (see FIGS. 7A and 7B), it may be known specifically and intuitively.

When the shutter release key is pressed to half while this process is executed repeatedly (Yes in step SA11), immediately (only when being displayed), the focus adjustable range (the numerical value 102 or display image 204) is erased from the screen (step SA12).

In succession, the process shown in FIG. 4 is executed. First, the focus search range corresponding to the set AF mode is set (step SA13), and the AF process by the contrast detection system is executed (step SA14). When the focal position is established (Yes in step SA15), the focus lens 2 is moved to the established focal position (step SA16). Then, while the shutter release key is pressed half, the process waits for full pressing of the shutter release key (instruction of photographing) (No in step SA17, Yes in step SA19), and when the shutter release key is pressed to the full (Yes in step SA17), photographed process is carried out, and the taken image is encoded and recorded in the memory card 18 as image data (step SA18). When the shutter release key half pressed state is canceled (No in step SA19), the process returns to step SA1 in FIG. 3.

Figure 9A:
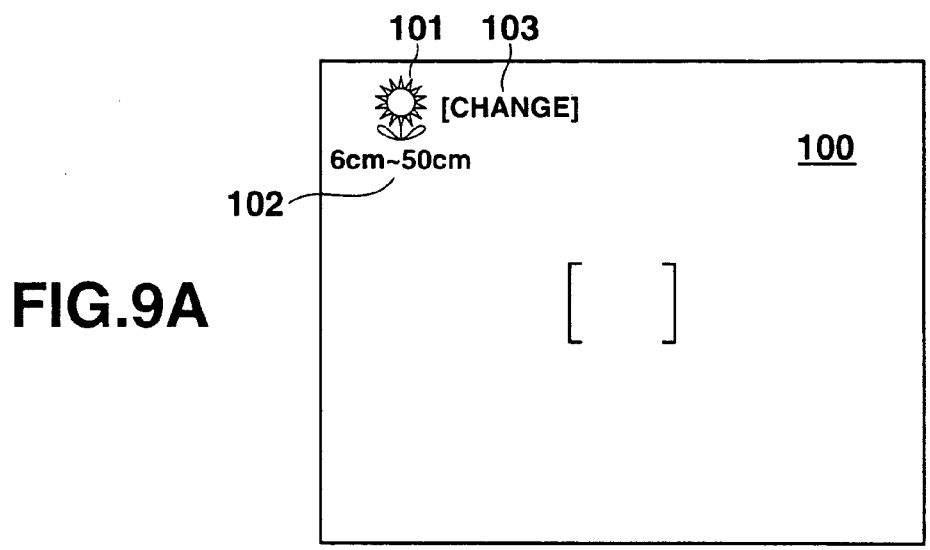
FIGS. 9A, 9B, and 9C are views showing a display state of a photographing distance corresponding to states of FIGS. 8A, 8B, and 8C.

On the other hand, if the focal position is not established in AF process, that is, if searching of the focal position is impossible (No in step SA15), the following process is executed. At this time, when the AF mode is set in the ordinary mode (Ordinary in step SA20), it is determined whether or not the change of the AF evaluation value is in an increasing tendency toward the close end of the focus search range, for example, as shown in FIG. 8A (step SA21). If the determination result is affirmative, it is highly possible that the subject distance is within the search range of the macro mode, and thus, the AF mode is automatically changed to the macro mode (step SA22). The notice of change of the AF mode to the macro mode and the focus adjustable range in the macro mode are displayed on the through-image by the numerical value (step SA23). FIG. 9A shows its example, in which in the upper left corner of the through-image screen 100, character of "Change" 103 is displayed in addition to the mode icon 101 for macro mode and the numerical value 102 same as displayed in step SB4 (FIG. 6A). Thereafter, back to step SA13, the focus search range is changed and AF process is started anew.

By contrast, when the determination result is negative in step SA21 and the change of the AF evaluation value is not in an increasing tendency toward the close end (including a case where the subject is dark), the focus lens 2 is moved to a reference position, for example, the central position of the focus search range in the ordinary mode (step SA24), and the process goes to step SA17. In this case, the photographer may cancel half pressing of the shutter release key, change the focus point in the subject, and press again the shutter release key to half, or press the shutter release key directly to the full to take the subject.

Figure 9B:
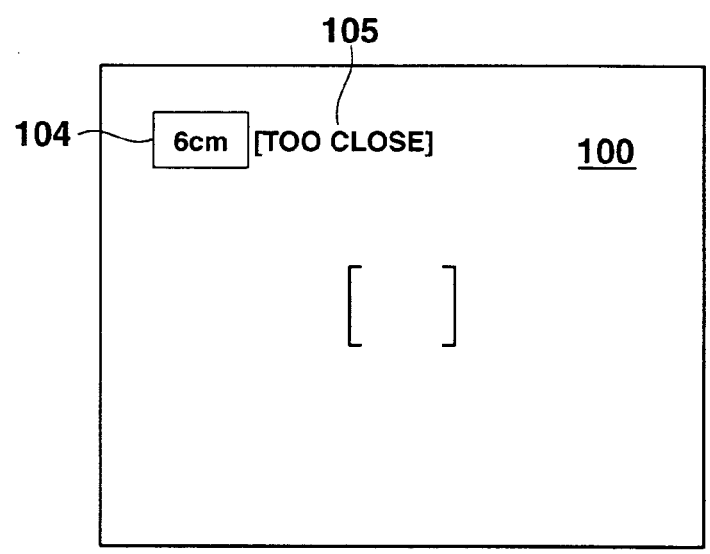

If searching of the focal position is impossible in the AF process (No in step SA15), and the AF mode is set in the macro mode (Macro in step SA20), it is determined whether or not the change of the AF evaluation value is in an increasing tendency toward the close end of the focus search range, for example, as shown in FIG. 8B (step SA25). If the determination result is affirmative, it is determined that the subject distance is closer to the close end of the focus adjustable range in the macro mode. Therefore, as shown in, for example, FIG. 9B, the shortest photographing distance 104 at this moment at the close end of the focus adjustable range is displayed in the upper left corner of the through-image screen 100, together with a warning message ("Too close" in this example) 105 (step SA26). Accordingly, the photographer recognizes the shortest photographing distance and knows that the subject distance is too short. Then, the focus lens 2 is moved to the reference position (step SA24), and the process goes to step SA17.

Figure 9C:
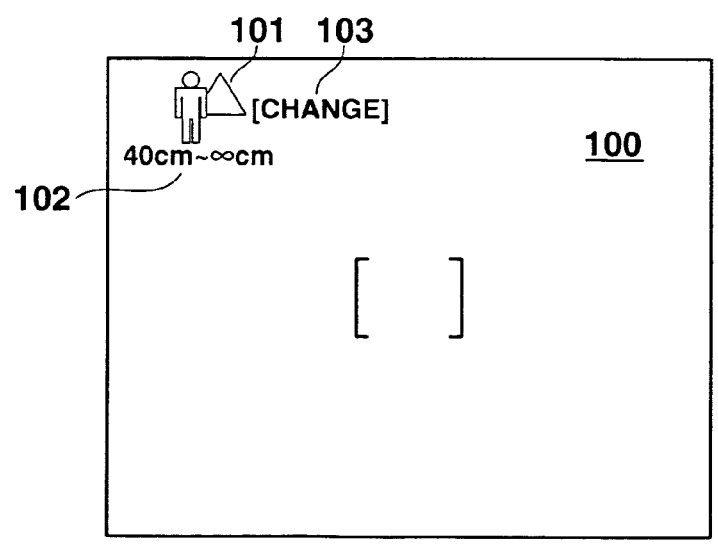

By contrast, when the determination result is negative in step SA25, that is, the change of the AF evaluation value is not in an increasing tendency toward the close end, it is further determined whether or not the change of the AF evaluation value is in an increasing tendency toward remote side of the focus search range, for example, as shown in FIG. 8C (step SA27). If the determination result is affirmative, the subject distance is determined to be in the search range in the ordinary mode, and the AF mode is automatically changed to the ordinary mode (step SA28). The notice of change of the AF mode to the ordinary mode and the focus adjustable range in the ordinary mode are displayed by a numerical value (step SA23). That is, as shown in FIG. 9C, in the upper left corner of the through-image screen 100, character of "Change" 103 is displayed in addition to the mode icon 101 for ordinary mode and the numerical value 102 same as displayed in step SB5 (FIG. 6B). Thereafter, back to step SA13, the focus search range is changed and AF process is started anew.

If the determination result is negative in both steps SA25 and SA27, that is, the change of the AF evaluation value is free from any tendency, or the peak position of the AF evaluation value cannot be searched (including a case where the subject is dark), the focus lens 2 is moved to the reference position (for example, the central position of the focus search range in the macro mode) (step SA24), and the process goes to step SA17. Also in this case, the photographer may cancel half pressing of the shutter release key, change the focus point in the subject, and press again the shutter release key to half, or press the shutter release key directly to the full to photograph the subject.

In this manner, before pressing the shutter release key to half when taking a picture, the photographer can know the focus adjustable range at the moment or the focus adjustable range after change, in the case of changeover of the AF mode or moving of the zoom position, specifically by the numerical value, or specifically and intuitively by the display image 204. After pressing the shutter release key halfway, the AF mode depending on the subject distance is always set automatically in the environment in which the automatic focusing function effective, so that changing operation of the AF mode is not necessary. In addition, when changing the AF mode, the change of the photographing distance for focusing on the subject is known together with the changed focus adjustable range.

Therefore, even if the photographer does not know (remember) the photographing distance specifically covered in each AF mode, it is known appropriately. Consequently, irrational focusing operation in a difficult state in which the focus adjustable range does not match with the subject distance can be avoided, and the convenience when using the automatic focusing function can be enhanced.

Display of the focus adjustable range in each AF mode is limited to a predetermined display timing when the focus adjustable range is changed, for example, when the AF mode is changed (manual or automatic), or when the zoom position is changed. Therefore, the focus adjustable range is not always displayed on the through-image when not required, and the imaging position can be determined in a favorable screen environment. Further, when the zoom position is changed, the changed focus adjustable range is displayed after zoom key operation is completed, thus the angle of view can be also determined in a favorable screen environment.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

For example, in this embodiment, after the shutter release key is pressed to half, the AF mode is changed over automatically depending on the subject distance to save the user's labor of changing over the AF modes in the environment in which the automatic focusing function is effective. However, such a function may be omitted, and the original object of the invention is achieved even in such case.

Further, in the embodiment, in the display timing when changing the AF mode or the like, the close end and remote end of the focus adjustable range set at this moment (or after change), that is, the focus search range are displayed, but both distances may not be always displayed. For example, only the close end may be displayed in the ordinary mode, or, either one of the close end and remote end may be displayed in the macro mode. More specifically, when the macro mode is set manually, it is highly possible that the photographer is intending a close-up, and only the close end may be displayed. When the ordinary mode is automatically changed to the macro mode after pressing the shutter release button to half, it is highly possible that the photographer is not intending a close-up, and only the remote end may be displayed.

The embodiment has described the digital camera 1 in which the ordinary mode and macro mode different in focus adjustable range are prepared as the AF modes, but the focus adjustable range in the AF mode may be only one. In such a case, only the changed shortest photographing distance (the close end of the focus adjustable range) may be displayed when changing the zoom position. Also in this case, the photographer can know the focus adjustable range of the subject in a desired zoom position (the zoom factor, angle of view). Even if the focus adjustable range in the AF mode is only one, the shortest photographing distance (the close end of the focus adjustable range) may be displayed if the subject distance is determined to be closer to the close end of the focus adjustable range by the AF process. Therefore, irrational focusing operation in a state in which the focus adjustable range and the subject distance are mismatched can be avoided, and the convenience when using the automatic focusing function can be enhanced. The AF mode may also include, in addition to the ordinary mode, a first macro mode of which focus adjustable range includes the shortest photographing distance, and a second macro mode of which focus adjustable range is set at remoter side than in the first macro mode, and the invention is also applicable in such a case.

The embodiment has explained the digital camera 1 having the AF function of the contrast detection system. However, the invention may be also applied to a digital camera having an active type AF function using a distance measuring sensor such as a phase difference sensor. In addition, it has been explained that the focus adjustable range is displayed in the color LCD of the image display unit 14 for displaying the through-image of the subject in the photographing waiting state, that is, in an electronic viewfinder. However, the focus adjustable range can be also displayed in a liquid crystal display configured by providing a transparent liquid crystal display in an optical viewfinder, or the focus adjustable range may be displayed in a liquid crystal display for information display. However, if the electronic viewfinder is used, the subject image and focus adjustable range can be simultaneously viewed by the user. Further, the invention may be also used effectively in other camera device than the digital camera.

What is claimed is:

1. A camera device comprising:
    a focus lens;
    a focus control unit which performs a focusing operation on a subject by driving the focus lens;
    a display unit;
    a selector which selects a display mode of the display unit; and
    a display control unit which controls the display unit to display a focus adjustable range for which the focus control unit can perform the focusing operation in the display mode selected by the selector.

2. The camera device according to claim 1, further comprising:
    a focus mode setting unit which sets a movable range of the focus lens, and
    wherein the display control mode includes a mode in which the focus adjustable range and mode information indicating the movable range set by the focus mode setting unit are displayed.

3. The camera device according to claim 1, further comprising:
    a detector which detects a change of the focus adjustable range, and
    wherein the display control unit controls the display unit to, when the change of the focus adjustable range is detected by the detector, display the focus adjustable range for a predetermined time.

4. The camera device according to claim 1, wherein the display mode includes a mode in which the focus adjustable range is displayed by a numerical value.

5. The camera device according to claim 1, wherein the display mode includes a mode in which the focus adjustable range is displayed by a graphic pattern including a distance scale.

6. The camera device according to claim 1, further comprising:
    a focus mode setting unit which sets a movable range of the focus lens, and
    wherein the focus unit performs the focusing operation on the subject by driving the focus lens based on the movable range set by the focus mode setting unit, and
    wherein the display control unit controls the display unit to display the focus adjustable range in the movable range set by the focus mode setting unit in the display mode selected by the selector.

7. The camera device according to claim 1, further comprising:
    a zoom lens, and
    wherein the display control unit controls the display unit to display the focus adjustable range which is changed in accordance with driving of the zoom lens in the display mode selected by the selector.

8. The camera device according to claim 1, further comprising:
    an image capture unit which captures an image of the subject, and
    wherein the display control unit controls the display unit to display the focus adjustable range together with the image of the subject.

9. A camera device comprising:
    an optical system including a focus lens and a zoom lens;
    a focus control unit which performs a focusing operation on a subject by driving the focus lens;
    a display unit;
    a zoom key which drives the zoom lens;
    a detector which detects a drive of the zoom lens; and
    a display control unit which controls the display unit to, when the drive of the zoom lens is detected by the detector, display a focus adjustable range of the focusing operation by the focus control unit.

10. The camera device according to claim 9, further comprising:
    an image capture unit which captures an image of the subject, and
    wherein the display control unit controls the display unit to display the focus adjustable range together with the image of the subject.

11. The camera device according to claim 9, further comprising:
    a second detector which detects a focus disable state when a subject distance is closer than a close end of the focus adjustable range, during the focusing operation of the focus control unit; and
    a second display control unit which controls the display unit to, when the focus disable state is detected by the second detector, display the focus adjustable range.

12. The camera device according to claim 11, further comprising:
    a focus mode setting unit which sets a movable range of the focus lens, and
    wherein the second detector detects the focus disable state when the focus mode setting unit sets the movable range such that the focus adjustable range includes a shortest photographing distance.

13. The camera device according to claim 9, further comprising:
    a second detector which detects a change of the focus adjustable range, and
    wherein the display control unit controls the display unit to, when the change of the focus adjustable range is detected by the second detector, display the focus adjustable range for a predetermined time.

* * * * *